Sept. 26, 1967

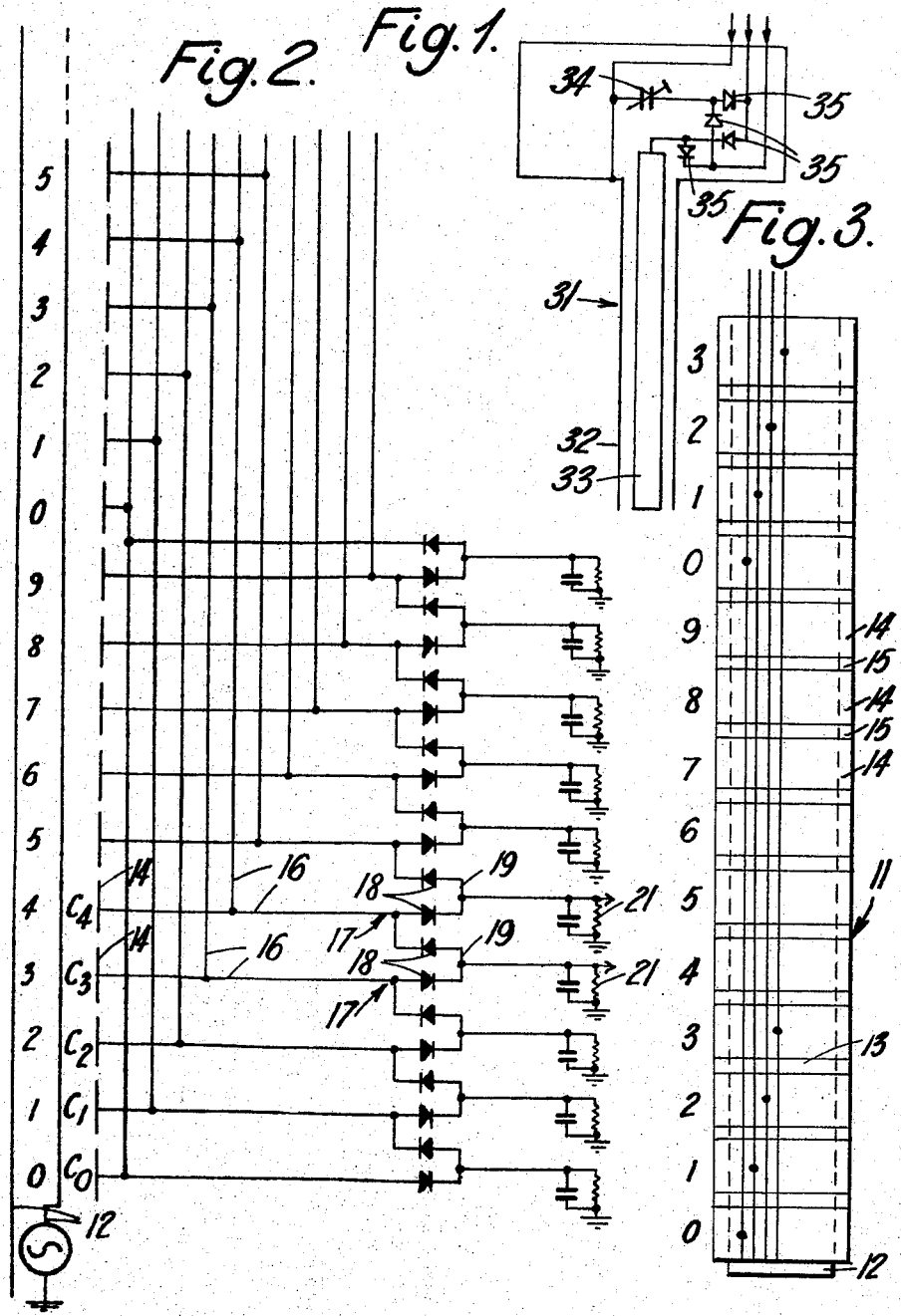

J. S. JOHNSTON 3,343,415

FLUID LEVEL SENSORS

Filed June 2, 1965

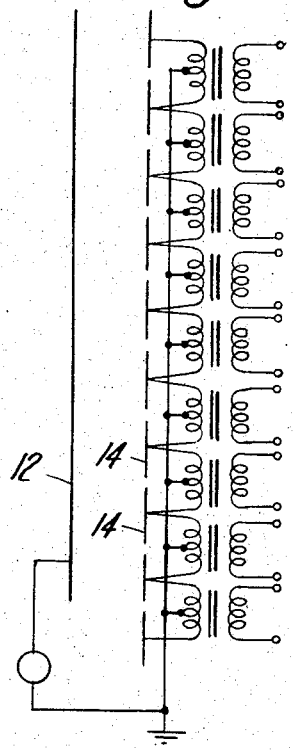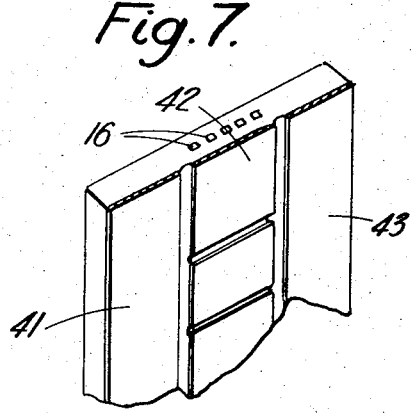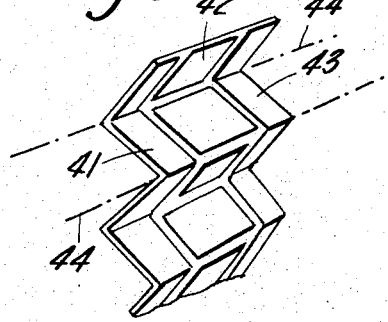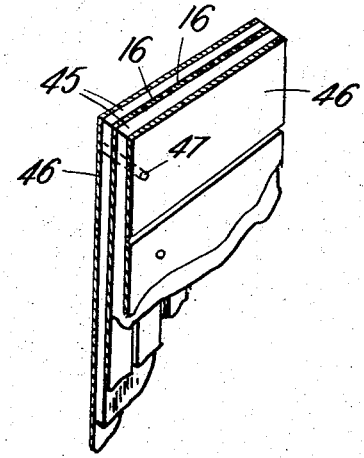

United States Patent Office 3,343,415
Patented Sept. 26, 1967

3,343,415
FLUID LEVEL SENSORS
James Stewart Johnston, Bognor Regis, England, assignor to Rosemount Engineering Company Limited, a British company
Filed June 2, 1965, Ser. No. 460,801
Claims priority, application Great Britain, June 4, 1964, 23,263/64
8 Claims. (Cl. 73—304)

ABSTRACT OF THE DISCLOSURE

A capacitance level gauge of the type having a series of vertically spaced capacitors. A substraction circuit is provided to differentiate between those capacitors exposed to liquid and those exposed to air. Several capacitor configurations are disclosed.

---

This invention relates to fluid level sensors.

According to this invention, there is provided a fluid level sensor comprising two capacitors arranged to be located at different levels and adapted for connection in parallel to an A.C. source, and further comprising a subtraction circuit connected to the capacitors for providing an output corresponding to the difference of the outputs from the two capacitors. The subtraction circuit may comprise a diode bridge circuit or a transformer circuit, the inputs of the bridge or transformer primary windings being connected across the capacitors to be compared. When the capacitors are connected in similar circuits and both capacitors are immersed in a fluid of high dielectric constant, they will conduct equal currents, and when both capacitors are exposed in a fluid of lower dielectric constant (such as air above the first fluid) they will conduct equal current of lower magnitude. In both these cases the output of the subtraction circuit will correspond to zero difference of dielectric constant. However, when the fluid level occurs at one of or between the two capacitors the mean dielectric constant of the medium between the capacitor electrodes is different for the two capacitors, and the currents will be different so that the substraction circuit will provide an output corresponding to a nonzero difference in capacitor currents. This subtraction circuit output may be arranged to operate an indicator showing that the fluid level is between the extremes of the two capacitors, or control means operable when the fluid level reaches the corresponding value.

The fluid level sensor may comprise more than two capacitors, each capacitor arranged to be located at a different level, and subtraction circuits respectively connected to pairs of adjacent capacitors.

Inhibiting means may be provided responsive to a subtraction circuit for inhibiting the action of the other subtraction circuits connected to one or other of the capacitors to which said subtraction circuit is connected. Conveniently a common electrode is provided for the or some capacitors, which electrode is adapted for connection to the alternating current source. The capacitors may be mounted on mounting means at equal intervals.

Indicating means are preferably connected to each subtracting circuit for indicating when the fluid level lies between the capacitors of a pair connected to the subtracting circuit. When the fluid level occurs at one capacitor, the subtraction circuit connected to that capacitor and the capacitor above it, and the subtraction circuit connected to that capacitor and the capacitor below it, will provide an output since the current flowing through that capacitor is different from the current flowing through the capacitors which are either totally immersed or totally exposed. The use of inhibiting means as described above, prevents two indicating means showing the fluid level to be present between two sets of capacitor pairs, which would be ambiguous.

The indicating means may be arranged to indicate a digit in a certain position in the number representing the fluid level, the capacitor pairs at levels whose numbers have the same digits at that position being connected together to a single subtracting circuit and to indicating means for that digit in that position. Similar apparatus may be provided for indicating digits in other positions in the number representing the fluid level, and when the number is on the decimal scale, the capacitors in such similar apparatus will have spacings differing by factors of 10. When the number is on the decimal scale, every tenth capacitor is preferably connected in parallel to a single subtracting circuit and, where provided, indicating means. In this case each subtracting circuit provides an output once each time the fluid level changes by ten intercapacitor intervals.

In containers of nonconstant cross-section, it may be more convenient to arrange capacitors at intervals corresponding to equal increments of volume of liquid in the container.

Examples of the invention will now be described with reference to the drawings accompanying the present specification, in which:

FIGURE 1 is a circuit diagram of part of a liquid level sensor similar to that described in copending U.S. patent application No. 242,166;

FIGURE 2 is a circuit diagram of part of a liquid level sensor of the invention;

FIGURE 3 is a diagrammatic side elevation of the lower end of the probe of the sensor of FIGURE 2;

FIGURE 5 shows the relation of voltages at points in FIGURE 2 to liquid level, and with respect to the accompanying drawings in which:

FIGURE 6 is a circuit diagram of a modification of FIGURE 2,

FIGURE 7 is a diagrammatic view of an alternative electrode assembly,

FIGURE 8 is a diagrammatic view of a further electrode assembly, and

FIGURE 9 is a diagrammatic view of another electrode assembly.

Figure 4:
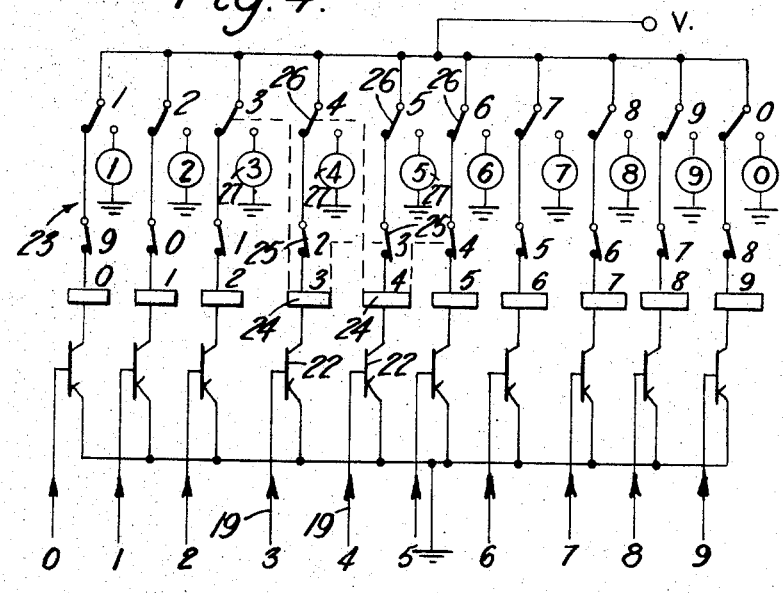
FIGURE 4 is a circuit diagram of an indicator circuit for use with the sensor of FIGURE 2.

A modification of the example to be described with reference to FIGURES 1 to 5 will be described with reference to the accompanying drawing, numbered FIGURE 6, which shows a modification of the circuit of FIGURE 2.

FIGURE 1 shows a single capacitance level sensor.

The sensor is connected in a circuit similar to that shown in FIGURE 3 of copending U.S. application No. 242,166. The sensor has a capacitative probe 31 formed by coaxial cylindrical electrodes 32, 33, and a trimming capacitor 34. The circuit compares the capacitances of capacitors 31, 34 as is described in the above application. The capacitor 34 is adjusted so that the circuit gives zero output when the probe 31 is completely exposed by the liquid.

Such sensors have the disadvantage of an analogue output, that is the liquid level sensor depends on the magnitude of the output from the circuit. To obtain high accuracy, a large amplitude alternating voltage is required to be fed into the circuit. The accuracy is also affected by the variation in forward conduction voltage of the diodes 35.

A sensor of the present invention is shown in FIGURES 2 to 5. This sensor gives a digital output in terms of liquid level. As the digits are either present or absent, low accuracy can be tolerated, so that a low amplitude alternating voltage can be used to drive the sensor circuit.

The liquid level sensor probe 11 has an inner cylindrical electrode 12 encircled by an outer annulus 13 spaced from the inner electrode 12 by about one tenth of the inner electrode diameter. The outer annulus 13 has a plurality of equal conducting cylinders 14 spaced by insulating cylinders 15 at equal intervals along the length of the annulus.

Ten electrically conducting connecting strips 16 (four only shown) pass down the outside of the annulus 13 and are connected to every tenth conducting cylinder 14. The connecting strips 16 are identical so that each one has the same stray capacity.

The two capacitors formed by the inner electrode 12 and two adjacent conducting cylinders 14 are connected by their connecting strips 16 in parallel to a subtracting circuit 17. The subtracting circuit 17 includes two diodes 18, the anode of one connected to one strip, the cathode of the other connected to the other strip, the output being taken from the other two electrodes connected together at 19.

The output from each of the ten subtraction circuits 17 is connected across a bypassed resistor 21 connected between the base and emitter of a transistor 22.

The collector circuit 23 of each transistor includes a relay coil 24, two relay operated contacts 25, 26 and an indicator lamp 27. One contact 25 is opened by operation of the relay coil 24 of the subtraction circuit 17 of one adjacent capacitor pair, and the second contact 26 is opened by the relay coil 24 of the other adjacent pair. The opening of a second contact 26 closes the supply circuit of the indicator lamp 27 associated with the said other pair. The association of contacts 25, 26 with relays 24 is shown by dotted lines in FIGURE 4. The two relay operated contacts 25, 26 are connected in series with the supply to the relay coil 24 so that on opening of either contact 25 or 26, the relay coil 24 may not be energized.

In operation, an alternating voltage of 50 volts peak to peak is fed to the inner electrode 12. The current through the capacitors arranged down the annulus 13 will depend on the dielectric constant of the medium between the inner electrode 12 and the annulus 13. The current through the immersed capacitors will be greater than that through the exposed capacitors assuming that the dielectric constant of the liquid is greater than unity. When the capacitors of an adjacent pair are both immersed or both exposed, the current fed to their respective connecting strips 16 will be equal. When adjacent connecting strips 16 carry equal currents, the output from the subtracting bridge circuit 17 of that pair will be zero.

When one capacitor of an adjacent pair is not either fully immersed or fully exposed, the currents conducted by the capacitors of the pair will differ. The associated subtraction circuit 17 will thus provide a non-zero output, which causes its associated transistor 22 to conduct.

Provided the contacts 25, 26 in its collector circuit 23 are closed, the relay coil 24 of the transistor 22 is energized and the contacts 25, 26 in the collector circuits of transistors 22 of adjacent capacitor pairs are opened, this inhibiting subsequent action of these adjacent transistors and energizing the lamp 27 indicating a digit of the value of the liquid level. As each subtraction circuit 17 is connected to every tenth capacitor pair, the lamp indicating one digit will be energized each time that digit occurs in the number representing the liquid level.

Figure 5:
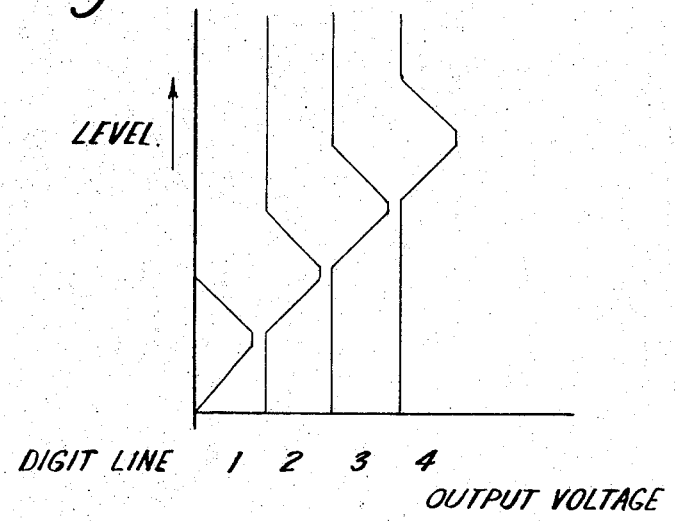

When the liquid level lies between the upper and lower edge of one conducting segment 14, the current flowing between the inner electrode 12 and that segment 14 will be different from that flowing to the segment immediately above and that immediately below it. There will therefore be nonzero outputs from two subtracting circuits 17. The values of the outputs from four subtracting circuits 17 of adjacent capacitor pairs for a range of liquid levels are shown in FIGURE 5. For an inner electrode diameter of 0.4 inch and an annulus/inner electrode spacing of 0.04 inch, the capacity of a capacitor formed by an inch long conducting segment 14 would change by about 8 pf. for unity change in dielectric constant, so that the change in current conducted by the capacitor would be eighty microamps for a 50 volt 100 kc./s. input signal.

The provision of the contacts 25, 26 in the transistor selector circuits 23 inhibits the simultaneous energisation of lamps 27 indicating two digits in the same order, which energisation would render the indication ambiguous. With this arrangement one transistor remains conducting and inhibits the conduction of adjacent capacitor pair transistors until the output of the subtraction circuit 17 connected to its base falls to zero. There is thus a slight difference in level indication between rising and falling levels. A level between two capacitors will not be indicated until the rising level rises above the upper edge of the lower conducting segment, whereas that level will continue to be indicated when the level is falling until the level falls below the lower edge of that segment. The intervals of conducting segments are conveniently units of inches or centimetres. The scale of the digital indication need not be decimal and may conveniently be binary or biquinary. Plain codes have the disadvantage that digits of two orders are sometimes required to change simultaneously, for example when the level changes from 19 to 20 in the decimal scale. In view of the delays mentioned above, which would lead to ambiguities if one digit changed before the other, it is more convenient to use reflected codes which are arranged so that consecutive numbers differ in only one digit. The problem of simultaneous change of two digits does not then arise. In place of or in addition to the indicator, a control device responsive to the liquid level may be provided.

The digital sensing of the liquid level requires a lower degree of accuracy in measurement of capacity than an analogue sensing, so that the amplitude of the applied alternating voltage may be lower and the matching of the diode characteristics is not important. The accuracy of this method does not depend on the value of the dielectric constant of the liquid, which might vary with temperature, but only on the dielectric constant being different from unity. The liquid dielectric may have large losses and may be electrolytically conducting.

When the level sensor is used in a fluid in which there is a fire or explosion risk, the electrodes are covered with a low dielectric plastics material (such as polytetrafluoroethylene or polythene) and the output impedance of the alternating voltage source is kept at a high value to reduce the energy in any spark which might occur. The low value of the alternating voltage required is another safety factor.

The plastics coatings prevent the reduction of impedance between the electrodes of the capacitors to a very low value when the liquids whose level is being sensed are highly conductive, such as acidified water or mercury.

With these plastics coatings the impedance between the capacitor electrodes does not fall below a value dictated by the thickness of the coating. The coating may be a refractory coating when high temperature liquids are to be used.

It is possible to arrange that the change in output signal at point 19 is the same whatever the dielectric constant of the liquid in the tank. In this case the A.C. input signal applied to the inner electrode 12 is made inversely proportional to the dielectric constant of the liquid in the tank by a feedbank capacitor in the A.C. source permanently immersed in the liquid in the tank. The feedback capacitor is conveniently connected at the lower end of the probe 11. A convenient feedback circuit arrangement is shown in FIGURE 6 of the specification of copending U.S. patent application No. 242,166. In that arrangement the current through a dummy gauge controls the output of the A.C. source. In the present arrangement the current through the immersed capacitor controls the A.C. source amplitude.

Although the probe 11 has been shown for convenience in FIGURE 2 as having a continuous inner electrode and segmented outer electrodes the positions of the continuous and segmented electrodes may be reversed.

In place of the diode bridge circuit as shown in FIGURE 2, a transformer circuit (FIGURE 6) will be used to provide an output when the currents flowing through adjacent capacitors are different. Such a transformer circuit provides an alternating current output which must be rectified before application to the relay circuit as shown in FIGURE 4.

The size of the probe depends on the requirements of the sensor. If a large capacitance per unit length of probe is required, the ratio of inner electrode diameter to the spacing of the inner and outer electrodes should be as large as possible. The diameter of the probe is limited only by the space available for its installation, but the width of the gap must be large enough to ensure that the surface tension of the liquid does not cause the liquid level in the gap to be significantly different from the level outside the installation due to capillary effects. In alternative constructions, the capacitors may have plane electrodes rather than cylindrical.

In tanks of nonuniform vertical cross-section, such as a cylindrical tank with its axis horizontal, the outer electrodes 14 may be positioned not at regular intervals as shown in FIGURES 2 and 3 but at levels corresponding to equal intervals of liquid volume. In this case, the capacitors are arranged at intervals corresponding to equal increments of volume of liquid in the tank, the intervals being inversely proportional to the mean cross-section of the tank at the level of the interval.

In place of the probe illustrated in FIGURES 1 and 3, an electrode assembly as shown in FIGURE 7 may be substituted. Plates 41, 42, 43 are mounted side by side in a plane on one surface of an insulating sheet to form the electrodes of the probe capacitors. The plates are mounted on three columns, the outer columns 41, 43 being connected together and constituting the common electrode 12 of all the capacitors, which electrode is connected to the alternating current source. The centre column 42 is divided at intervals to form the second electrode 14 of the capacitors.

This arrangement of electrode plates in a plane provides a reduced capacity, but is convenient to manufacture.

The assembly may be arranged to fold into a zig-zag shape along lines passing between the plates on the central column 62 so that the length of the assembly may be adjusted to fit the range of levels to be sensed. Such an arrangement is shown diagrammatically in FIGURE 8.

FIGURE 9 shows a laminated electrode assembly, including a number of connecting strips 16 insulated from each other and arranged in a plane, insulating sheets 45 on either side of the plane of the connecting strips 16 and electrode plates 46 arranged on the outer sides of the insulating sheets 45. The pattern of the plates 46 corresponds on both sides of the assembly. Pins 47 electrically connect the electrode plates 46 together and to the appropriate connecting strip 16. The assembly of FIGURE 9 may comprise the central column of the arrangement of FIGURES 7 or 8, or the common electrode 12 of the sensor may be arranged separately from the assembly of FIGURE 9.

The assemblies of FIGURES 7 to 9 are conveniently formed with a continuous plate on one or both sides of the insulating sheet or sheets, the capacitor electrodes being separated by scoring through the continuous sheet to the insulating sheet below. The size and intervals of the electrode plates can then be selected to suit the application of the particular electrode assembly.

I claim:

1. A fluid level sensor comprising a probe for immersion in the fluid, a plurality of capacitors mounted on the probe at different levels in the fluid, at least one electrode of each capacitor being formed on an electrode assembly comprising plates mounted in a plane on one side of a common insulating sheet, connecting strips on the other side of said common insulating sheet for connecting the capacitors in parallel to an alternating current source and pins extending through said insulating sheet connecting appropriate electrodes to said strips, and subtraction circuits each connected to pairs of capacitors at adjacent levels for providing an output corresponding to the difference of the currents flowing in the capacitors of the pair.

2. A fluid level sensor comprising a probe for immersion in the fluid, a plurality of capacitors mounted on the probe at different levels in the fluid, connecting means for connecting the capacitors in parallel to an alternating current source, subtraction circuits respectively connected to pairs of capacitors for providing an output corresponding to the difference of the currents flowing in the capacitors of a pair, an electrode assembly for the capacitors comprising a common insulating sheet, and plates mounted on one side of the sheets, which plates form at least one electrode of each capacitor, certain of said plates being located at vertically spaced intervals one above the other, the electrode assembly being folded into a zig-zag shape at said spaced intervals.

3. A fluid level sensor comprising a probe for immersion in the fluid, a plurality of capacitors mounted on the probe at different levels in the fluid, at least one electrode of each capacitor being formed on an electrode assembly including connecting strips mounted between two insulating sheets in aligned relationship for connecting the capacitors in parallel to an alternating current source, plates on opposite sides of the assembly being connected together by pins passing through the insulating sheets and appropriate connecting strips, and subtraction circuits each connected to pairs of capacitors at adjacent levels for providing an output corresponding to the difference of the currents flowing in the capacitors of the pair.

4. A fluid level sensor comprising a probe for insertion in the fluid, a plurality of capacitors arranged on the probe at different levels in the fluid, connecting means for connecting the capacitors in parallel to an alternating current source, first and second pluralities of diode means, each diode means having an anode and a cathode, each of said capacitors being coupled to the anode of a diode means in said first plurality of diode means and to the cathode of a diode means in said second plurality of diode means, a plurality of junctions, each of said junctions being connected to the cathode of the diode means in said first plurality of diode means and to the anode of the diode means in said second plurality of diode means, a plurality of output terminals, and respective means connecting one of said junctions to one of said terminals.

5. A fluid level sensor as claimed in claim 4 wherein each of said last-mentioned connecting means includes a smoothing circuit having an input and an output, the input of each said smoothing circuit being coupled to a respective one of said junctions and the output of each said smoothing circuit being coupled to a respective one of said terminals.

6. A fluid sensor as claimed in claim 5 wherein said probe is formed with a common electrode for at least some of the capacitors mounted on the probe, which electrode is connected to said first-mentioned connecting means.

7. A fluid level sensor as claimed in claim 5 wherein at least one electrode of each capacitor is formed on an electrode assembly comprising plates mounted in a plane on one side of a common insulating sheet, connecting strips on the other side of said common insulating sheet for connecting the capacitors in parallel to an alternating current source and pins extending through said insulating sheet connecting appropriate electrodes to said strips.

8. A fluid level sensor as claimed in claim 4 wherein at least one electrode of each capacitor is formed on an electrode assembly comprising connecting strips mounted between two insulating sheets in aligned relationship for connecting the capacitors in parallel to an alternating source, plates on opposite sides of the assembly being connected together by pins passing through the insulating sheets and appropriate connecting strips.

References Cited

UNITED STATES PATENTS

| | | | |
|---|---|---|---|
| 2,852,937 | 9/1958 | Maze | 73—304 |
| 2,868,015 | 1/1959 | Horopulos | 73—304 |
| 2,963,908 | 12/1960 | Shawhan | 73—304 |
| 2,996,915 | 8/1961 | Greenwood | 73—304 |
| 3,010,320 | 11/1961 | Sollecito | 73—304 |
| 3,145,567 | 8/1964 | Bobrowsky | 73—304 |

FOREIGN PATENTS 819,711  9/1959  Great Britain.

LOUIS R. PRINCE, *Primary Examiner.*

S. C. SWISHER, *Examiner.*